United States Patent [19]

Coyle et al.

[11] Patent Number: 4,882,014

[45] Date of Patent: Nov. 21, 1989

[54] ELECTROCHEMICAL SYNTHESIS OF CERAMIC FILMS AND POWDERS

[75] Inventors: R. Tom Coyle, Yorba Linda, Calif.; Jay A. Switzer, Pittsburgh, Pa.

[73] Assignee: Union Oil Company of California, Los Angeles, Calif.

[21] Appl. No.: 159,759

[22] Filed: Feb. 24, 1988

[51] Int. Cl.$^4$ ................................................ C25B 1/00
[52] U.S. Cl. ................................ 204/1.5; 204/10; 204/38.6; 204/96; 204/DIG. 6; 264/DIG. 25; 264/DIG. 36
[58] Field of Search .................. 204/37.1, 96, 86, 1.5, 204/10, 38.6, DIG. 6; 264/64, DIG. 36, DIG. 25

[56] References Cited

U.S. PATENT DOCUMENTS

| | | | |
|---|---|---|---|
| 3,073,763 | 1/1963 | Beer | 204/10 |
| 3,338,802 | 8/1967 | Nielsen et al. | 204/1.5 |
| 4,020,134 | 4/1977 | Gordon et al. | 264/63 |
| 4,098,725 | 7/1978 | Yamamoto et al. | 252/519 |
| 4,383,897 | 5/1983 | Gillich et al. | 204/33 |
| 4,501,818 | 2/1985 | Rossi | 501/1 |
| 4,520,077 | 5/1985 | Lavezzari | 204/27 |
| 4,585,540 | 4/1986 | Beer et al. | 204/290 F |
| 4,605,631 | 8/1986 | Rossi | 501/1 |
| 4,615,736 | 10/1986 | Armor et al. | 75/251 |
| 4,657,754 | 4/1987 | Bauer et al. | 423/625 |
| 4,657,879 | 4/1987 | Nicholson et al. | 501/152 |

OTHER PUBLICATIONS

Switzer and Coyle, Poster at "Third International Conference on Ultrastructure Processing of Ceramics, Glasses and Compositions," Feb. 24, 1987, San Diego, California.

*Primary Examiner*—John F. Niebling
*Assistant Examiner*—David G. Ryser
*Attorney, Agent, or Firm*—Alan H. Thompson; Gregory F. Wirzbicki

[57] ABSTRACT

Ceramic precursor compositions, such as metal hydroxides and oxides, are electrochemically deposited in a biased electrochemical cell. The cell typically generates hydroxide ions that precipitate metallic or semimetallic ions to form insoluble solids that may be separated from the cell, then dried, calcined and sintered to form a ceramic composition.

16 Claims, No Drawings

ELECTROCHEMICAL SYNTHESIS OF CERAMIC FILMS AND POWDERS

BACKGROUND OF THE INVENTION

The invention relates to the preparation of ceramic precursor compositions, and more particularly to the preparation of ceramic metal oxide-containing powders.

A common method for the production of sub-micron sized powders of ceramic precursor compositions is precipitation or co-precipitation of an oxide precursor from aqueous solution of a salt of the metal or metals to be used. Commonly, oxides, hydroxides, oxycarbonates, oxalates, etc. all usually with varying degrees of hydration, are precipitated at an appropriate pH. In such cases, the precipitate frequently has inhomogeneities due to variations within the reaction vessel or forms a gel. Both of these present practical processing problems. For instance, filtration of the gel is often difficult because of clogging of the pores of the filter, desalting of the gel by washing is tedious, and oven drying of a purified gel often yields unsinterable powders. Inhomogeneities result in low green densities and poor sintering behavior.

Other established methods for the production of sinterable ceramic precursor compositions include high temperature oxidation of metal salts with oxygen and/or water vapor, hydrolysis and thermal decomposition of alkoxides and hydrothermal reaction of metals or alloys. Such methods usually require complex and expensive equipment and/or expensive starting materials and thus find relatively little industrial use.

It is desirable that sub-micron sized powders of the ceramic precursor compositions prepared by such methods be highly reactive, sinter at relatively low temperatures, provide relatively high green (presintered) densities, be amenable to film-forming techniques such as tape casting and give finished ceramic compositions with desirable microstructures.

Accordingly, it an object of the present invention to provide a novel method for preparing ceramic precursor compositions by controlling the microstructure of such compositions.

SUMMARY OF THE INVENTION

The method of the invention relates to the production of a ceramic precursor composition by electro-chemical deposition of a ceramic precursor composition. A base material, such as hydroxide ion, is electrochemically generated at an electrode of an electrochemical cell and such base material reacts with a metallic ion to produce a ceramic precursor composition. Alternatively, an acid material, such as hydronium ion, may be electrochemically generated to produce ceramic precursor compositions by reaction with metallic anions for such materials as silicates. Electrode reactions for other ceramic products such as carbides, nitrides and silicides are achieved by using suitable solvents and reagents to produce ceramic precursor compositions for such ceramics. The ceramic precursor composition is a solid material, such as a precipitate or deposition on a cell electrode, which is separated from the other components of the cell. After drying, or after drying and calcination, the electrochemically generated ceramic precursor composition is sintered to produce a ceramic composition.

In one embodiment, base material is electrochemically generated in the presence of metal ions or metal complexes. The electrogenerated base material causes precipitation of the metal ion which produces a ceramic precursor composition which is ordinarily a metal hydroxide or metal oxide.

The method leads to relatively pure products and allows control of the microstructure of the precursor since the rate of generation of acid or base material is directly related to the applied electrical current to a biased cell. The particulate compositions prepared by the method of the invention are highly reproducible and the particle sizes readily predictable.

DETAILED DESCRIPTION OF THE INVENTION

Ceramic precursor compositions, as used herein, includes those solid materials electrochemically generated or produced in the anode or cathode compartments of an electrochemical cell and further include those electro-chemically produced materials that are dried or non-dried, calcined and non-calcined solid materials that have not been sintered. A ceramic composition, as used herein, is a sintered or partially sintered ceramic precursor composition. As used herein, ceramic precursor compositions include ceramic powders and ceramic powder precursors for use in making "advanced" or "fine" ceramics. Advanced ceramics are understood to include those having stringent property and reliability requirements in applications such as electronics, optoelectronics, high temperature heat exchangers, ceramic cutting tools, fuel cells, phosphors, medical, space, ceramic automobile engines and power turbines Base and acid materials are electrochemically generated at the cathode and anode, respectively, of an electrochemical cell typically containing a cathode and anode compartment containing starting materials for ceramic precursor compositions. The starting materials when the electrochemical cell generates base and acid material comprise decomposable anions and cations, respectively, that leave little or no residue after calcination of a ceramic precursor composition. Starting materials for base generation include any metallic or semimetallic cation, particularly the lanthanides, actinides and transition metals. Preferred metallic cations include magnesium, berylium, aluminum, thorium, uranium, yttrium, zirconium, cerium, lanthanum, and germanium. Preferred anions for the base generation system include chlorate, sulfate, chloride, and preferably nitrate, acetate, citrate and the like. Starting materials for acid generation include decomposable cations such as hydrogen, ammonium, and organic cations, and anions which convert to carbides, nitrides, silicides, and the like.

Any ceramic precursor composition may be prepared by the electrochemical method of the invention; however, electrochemically generated base materials typically are utilized in the production of metal hydroxide and metal oxide ceramic precursor compositions. Examples of ceramic compositions prepared from the electrochemically generated ceramic precursor compositions of the invention include lanthanide oxide ($La_2O_3$); SiC; $Si_3N_4$, $Si_3N_4$ with lanthanide oxide sintering aids; $ZrO_2$, $ZrO_2$ with lanthanide oxide stabilizing agents; AlN, AlN with lanthanide oxide sintering aids; $CeO_2$, $CeO_2$ with lanthanide oxide additives; $BaTiO_3$, $BaTiO_3$ with lanthanide oxide additives; $Al_2O_3$, $Al_2O_3$ with lanthanide oxide sintering aids; $SiO_2$; lanthanide containing oxide compounds such as: neodymium gallium titanate, lanthanide barium cuprate, lanthanum strontium barium cuprate, bismuth strontium calcium cuprate, boron nitride, zinc ferrite, WC, TiC, gadolinium scandium, barium garnet, gadolinium scandium aluminum garnet, yttrium europium oxysulfide, $UO_2$, $ThO_2$, $ThO_2:Nd_2O_3$, MgO, BeO, $LiAlO_2$, $TiO_2$, Sialon ceramics with and without lanthanide oxide additives, $Pb(Zr,Ti)O_3ZnO$, lead lanthanum zirconate titanate, $SnO_2$, $LaB_6$, and $Ba_2NaNb_5O_{15}$.

In the method of the invention, the starting materials for the production of the ceramic precursor compositions are placed in the anode and/or cathode compartments of an electrochemical cell. Usually the starting materials are contained in aqueous solutions that provide base materials such as hydroxide ions at the cathode or in the cathode compartment; however, the starting materials may also comprise non-aqueous and organic solvents and may also include materials that provide acid materials that produce ceramic precursor compositions at the anode or in the anode compartment. The electrochemical cell is biased since the species of the starting materials typically do not spontaneously react upon contact to form solid materials. As the cell operates, a ceramic precursor solid composition deposits on the electrode or is formed in the electrode compartment, preferably not depositing on the electrode. If the ceramic precursor solid composition is deposited in the compartment, it is a slightly soluble or insoluble solid such as a precipitate or resembles a precipitate. If the ceramic precursor solid composition is deposited on the electrode, the deposit is usually separated from the electrode and dispersed.

The dispersed solid ceramic precursor composition is usually separated from the cell and dried, such as by spray drying or evaporation of water if the starting materials include aqueous solutions. The dispersed composition The dispersed and dried ceramic precursor composition is typically a particulate solid composition such as a powder. is typically calcined and compressed to form a green body prior to sintering. The dispersed and dried ceramic precursor composition may also be in a form that can be readily compressed to form a green body and sintered to produce a finished ceramic composition. For example, if the solid ceramic precursor composition is an oxide, a calcination step may be unnecessary.

The calcined, particulate ceramic precursor composition is usually compressed to a green body having a green density that is about 20 to about 70 percent of the theoretical density of the finished ceramic composition. The green densities are preferably greater than 40 percent of the theoretical density. After compressing (i.e., pelletizing, etc.), the green body is sintered at a temperature greater than about 500° C. and typically in the range from about 600° C. to 2,000° C., although it is preferred that the sintering temperature be less than about 1,600° C.

The particle size of the dispersed and dried particulate ceramic precursor composition is usually in the range from about 0.05 to about 1.5, preferably about 0.1 to about 1.0, and most preferably about 0.3 to about 0.7 micrometers, calculated in diameter. The crystallite size of the ceramic precursor composition is usually in the range from about 10 to about 10,000 angstroms in diameter. Typically the dispersed and dried ceramic precursor composition has crystallite sizes in the range from about 50 to about 500 angstroms and the calcined compositions are in the range from about 600 to about 10,000 angstroms.

The invention is further illustrated by the following examples which are illustrative of specific modes of practicing the invention and are not intended as limiting the scope of the invention defined by the appended claims.

EXAMPLE 1

Fifty milliliters (50 ml) of an aqueous solution of 0.10 molar potassium sulfate ($K_2SO_4$) is electrolyzed in a divided electrochemical cell biased with a potential of $-0.85$ V. vs. NHE. Hydrogen gas is evolved at a platinum cathode and oxygen gas is evolved at a platinum anode. The pH in the cathode compartment is monitored as a function of time. The data are summarized in Table 1 as follows:

TABLE 1

| Time (min.) | Coulombs | pH |
|---|---|---|
| 0 | 0 | 4.5 |
| 2 | 4.79 | 6.3 |
| 4 | 8.79 | 6.7 |
| 5 | 10.74 | 12.1 |
| 6 | 12.63 | 13.03 |

As shown in Table 1, the increase in the value of the pH indicates an increase in the concentration of base material, i.e., hydroxide, in the cathode compartment during the course of the electrolysis.

EXAMPLE 2

Fifty milliliters(50 ml) of an nonaqueous quinone solution of 1.0 solar sodium perchlorate ($Na_2ClO_4$) is electrolyzed in a divided electrochemical cell containing a platinum anode and cathode and which is biased at a potential at which there is no hydrogen gas production (i.e. $-0.716$ V. vs. NHE).

A few drops of acid are added to lower the pH in the cathode compartment and the pH is monitored as a function of time. The data are summarized in Table 2 as follows:

TABLE 2

| Time (min.) | Coulombs | pH |
|---|---|---|
| 0 | 0 | 2.81 |
| 5 | 42.9 | 3.10 |
| 10 | 84.53 | 3.40 |
| 13 | 107 | 5.80 |
| 13.5 | 112 | 8.13 |
| 14 | 115 | 8.80 |
| 15 | 123 | 9.30 |

As is the case in Example 1, the increase in the value of the pH in the cathode compartment indicates an increase in the concentration of base material, i.e., hydroxide, during the course of the electrolysis.

EXAMPLE 3

A ceramic precursor composition, lanthanum hydroxide, is generated in an electrochemical cell containing lanthanum nitrate in the cathode compartment of the cell.

A 50 ml aqueous solution of lanthanum nitrate is placed in the cathode compartment of an electrochemical cell. A platinum anode and cathode is contained in compartments separated by a nafion membrane. The anode compartment contains an aqueous solution of 1.0 molar sodium nitrate. The solutions are electrolyzed under galvanostatic conditions with a current of 300 milliamperes and the initial electrode potential at −0.5 V. vs. NHE.

After a total of 21880 coulombs, a white powder which is formed in the cathode compartment is filtered, washed with water, and dried in a vacuum oven at 60 C. The powder is identified by X-ray diffraction to be lanthanum hydroxide with a very small crystallite size of about 100 angstroms. After three days of calcining the lanthanum hydroxide at 1000 C., the crystallinity is increased. After calcining the lanthanum hydroxide for an additional day at 1,200 C., the lanthanum hydroxide is converted to lanthanum oxide ($La_2O_3$) having an average crystallite size, as determined by X-ray diffraction, of about 750 angstroms. The lanthanum oxide is suitable for use in a ceramic composition.

EXAMPLE 4

Eighty milliliters of an aqueous solution of 1.0 molar ammonium nitrate are placed in the cathode compartment of an electrochemical cell similar to that in Example 3, except the applied current is 100 milliamperes and the total coulombs are 8,890. A ceramic precursor material is deposited at the cathode, separated and dried overnight in a vacuum oven at 100 C.

The ceramic precursor material is ceric oxide ($CeO_2$) and has a crystallite size of about 100 angstroms as determined by X-ray diffraction. After calcining the ceric oxide at 1,000 C. for 3 days, the crystallite size is determined to have increased to about 1,000 angstroms. The ceric oxide is then dispersed and the average particle size determined to be 1.75 micrometers with a Coulter Counter.

An aqueous solution of polyvinyl pyrrolidine is added to the ceric oxide powder to form a slurry having 3.0 percent of polyvinyl pyrrolidine based on the weight of ceric oxide. A powder is then formed from this slurry by spray drying. The dried ceric oxide/binder material is then percent of theoretical density. The ceric oxide/binder pellets are heated to 500 C. at 50 C. per hour to remove the binder and then heated to a sintering temperature of 1,375 C. at 100 C. per hour (where sintering is complete as determined at 100 C. per by dialtometry) to produce a sintered ceramic composition which is 90 percent of theoretical density.

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A method for the production of a ceramic precursor composition, said method comprising the step of electrochemical deposition of a ceramic precursor composition in a biased electrochemical cell having a anode and a cathode wherein acid or base materials are electrochemically generated at the anode or cathode, respectively, of said cell and said acid or base materials reacting with starting materials in said electrochemical cell to produce an electrodeposited ceramic precursor composition.

2. The method defined in claim 1 wherein said ceramic precursor composition is selected from the group consisting of metal-containing oxides, metal-containing hydroxides, carbides, nitrides and silicides.

3. The method defined in claim 1 further comprising the step of drying said ceramic precursor composition.

4. The method defined in claim 3 further comprising the step of calcining the dried ceramic precursor composition obtained in claim 3.

5. The method defined in claim 4 further comprising the step of sintering the calcined ceramic precursor composition obtained in claim 4 to produce a ceramic composition.

6. The method defined in claim 5 wherein said ceramic composition is selected from the group consisting of $La_2O_3$, SiC, $ZrO_2$, AlN, $CeO_2$, $BaTiO_3$, $Al_2O_3$, $SiO_2$, neodymium barium titanate, lanthanide barium cuprate, lanthanum strontium barium cuprate, bismuth strontium calcium cuprate, boron nitride, zinc ferrite, WC, TiC, gadolinium scandium, barium garnet, gadolinium scandium aluminum garnet, yttrium europium oxysulfide, $UO_2$, $ThO_2$, $ThO_2$: $Nd_2O_3$, MgO, BeO, $LiAlO_2$, $TiO_2$, $Pb(Zr,Ti)O_3$, ZnO, lead lanthanum zirconate titanate, $SnO_2$, $LaB_6$, and $Ba_2NaNb_5O_{15}$ and mixtures thereof.

7. A method for producing a ceramic precursor composition, said method comprising the following steps: (1) electrochemically generating acid or base materials at an anode or at a cathode respectively, of a biased electrochemical cell containing an anode compartment separated from a cathode compartment, said acid or base materials reacting with starting materials contained in said compartments to produce an electrodesposited ceramic precursor composition and (2) said electrochemically deposited ceramic precursor composition obtained in step (1) is dispersed and dried.

8. The method defined in claim 7 further comprising step (3) wherein the dispersed and dried ceramic precursor composition obtained in step (2) is calcined.

9. The method defined in claim 8 further comprising step (4) wherein the calcined ceramic precursor composition obtained in step (3) is sintered or partially sintered.

10. The method defined in claim 8 further comprising step (4) wherein the dried ceramic precursor composition obtained in step (3) is compressed to form a green body and then is sintered.

11. The method defined in claim 8 wherein the calcined ceramic precursor composition obtained in step (3) has a crystallite size in the range from about 600 angstroms to about 10,000 angstroms, calculated as the diameter.

12. The method defined in claim 7 further comprising step (3) wherein the dispersed and dried ceramic precursor composition obtained in step (2) is sintered or partially sintered.

13. The method defined in claim 7 wherein said cathode compartment contains a metallic or semimetallic ion in a solution containing water and wherein said water is hydrolyzed to generate hydroxide ions.

14. The method defined in claim 7 wherein the dispersed and dried ceramic precursor composition obtained from step (2) has crystallite size in the range from about 50 angstroms to about 500 angstroms, calculated as the diameter.

15. The method defined in claim 7 wherein the dispersed and dried ceramic precursor composition obtained in step (2) has an average particle size in the range from about 0.1 micrometers to about 1.0 micrometers, calculated as the diameter.

16. A method for producing a ceramic precursor composition, said method comprising the following steps: (1) electrochemically depositing a ceramic precursor composition in a cathode compartment of a biased electrochemical cell which contains an anode and anode compartment separated from a cathode and cathode compartment, said electrochemical cell generating a base material at the cathode in the cathode compartment and said ceramic precursor composition containing a metal oxide or metal hydroxide, (2) said electrochemically deposited ceramic precursor composition obtained in step (1) is dispersed and dried, and (3) said dispersed and dried ceramic precursor composition obtained in step (2) is compressed to a green body and sintered to produce a ceramic composition containing a metal oxide.

* * * * *